July 28, 1931. A. L. J. QUENEAU 1,816,742
METHOD OF PRODUCING TIN
Filed Jan. 6, 1928
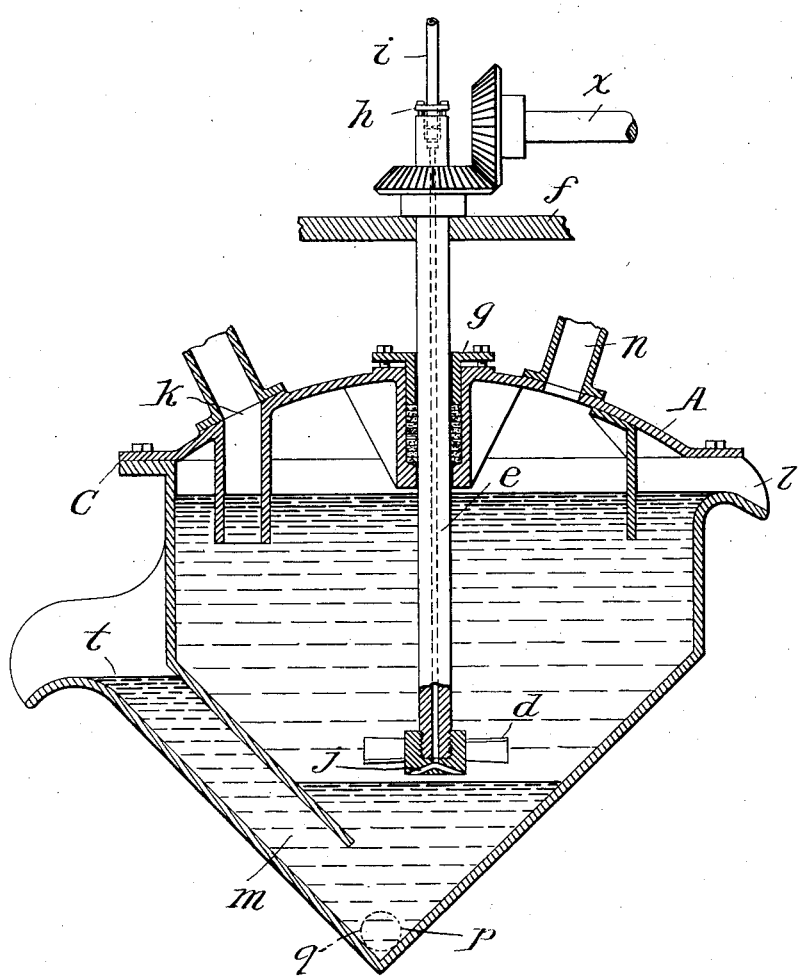
Inventor
Augustin Leon Jean Queneau
By his Attorney
D. Anthony Usina Patented July 28, 1931

1,816,742

UNITED STATES PATENT OFFICE

AUGUSTIN LEON JEAN QUENEAU, OF NEW YORK, N. Y.

METHOD OF PRODUCING TIN

Application filed January 6, 1928. Serial No. 244,969.

The invention relates to the recovery of tin from various tin oxides, such as roasted natural cassiterite, artificial oxides, or any other form of commercial tin bearing materials in the form of oxide.

In a co-pending application, Serial No. 165,720 filed February 3, 1927, which has matured into Patent 1,718,378, June 25, 1929, I have disclosed a broadly novel method of reducing certain metals. In said application I have described and claimed the invention with particular reference to the recovery of zinc. Since filing said application I have made further research and experiments and have discovered that by a very similar method I can effectively reduce tin from its oxide.

While tin has a low melting point, 232° C., the reduction of its oxide $SnO_2$ by carbon, as practiced in shaft and reverberatory furnaces, requires temperatures of 1300° C. and upwards. It is a well known fact that tin oxide is readily reduced to metallic form at a much lower temperature by various gases than in the case of carbon reduction. With pure hydrogen the reduction begins at a temperature as low as 200° C. It is very active above 500° C. and at 1000° C. it is practically instantaneous. Care has to be taken in these reactions to remove as rapidly as produced the gaseous product of reduction, water vapor, according to the reaction $$SnO_2 + 2H_2 \rightarrow Sn + 2H_2O.$$

Carbon monoxide also reduces tin oxide, but at higher temperatures than hydrogen and less actively.

The stanniferous material is first crushed or pulverized to such a degree that it will pass through say a 60 mesh screen or finer and is then completely dehydrated.

As a medium for effecting the reaction, I use a molten bath of anhydrous chlorides, preferably ternary chlorides of sodium, potassium and calcium of the general molecular formula: 50 NaCl, 20 KCl and 30 $CaCl_2$, in which ternary salt, part of the sodium chloride, is with advantage, replaced in varying proportion by sodium, aluminum and calcium fluorides. The molecular formula given is merely an illustration and may vary. The selected ternary salt melts at 490° C. and above that temperature it is a mobile liquid. It can be heated within a wide range of temperature up to 800° C. and over without appreciable losses through volatilization. It is inert toward tin oxide or metal.

The dry tin oxide is added to the molten anhydrous mixed salts in a mixing kettle approximately in the proportion of 100 parts of tin bearing material to 75 parts of the molten chlorides. In this proportion a fluid pulp is readily maintained by any suitable mechanical agitator. It is in all appearances but temperature a pulp as it is understood in dressing mill practice, the water being replaced by the molten chlorides.

The temperature of the pulp is maintained throughout at about the optimum temperature, 800° C., while a stream of anhydrous hydrogen, preferably preheated, is forced through the mass at its lowest point. The reduction of the suspended tin oxide proceeds. The liberated metal, as a liquid, drops to the lowest level of the kettle, owing to its higher specific gravity, 7.1 against the pulp gravity of about 4, while the liberated water vapor, steam, mixes with and is carried away by the unused hydrogen passing through the kettle, thus efficiently removing the steam from contact with the reduced metal.

The accompanying drawing is a longitudinal section through a suitable kettle in which the reduction is carried out.

Referring to the drawing, the reduction of the tin oxide is carried out in a covered kettle A, of cast iron, steel or of special alloy of the general form of a caustic pot or a Parkes process kettle.

The agitation of the pulp is maintained for example by an impeller or paddle $d$, fastened to a vertical shaft $e$, supported from a framework $f$, outside of the kettle and rotated by any suitable source of power $x$. A gland $g$ is provided in the kettle cover to prevent any free passage of gas (air or hydrogen, etc.) through the shaft opening.

The introduction of the hydrogen is preferably made through the vertical shaft $e$ which is made hollow. This shaft is provided at its upper extremity with a stuffing box $h$, through which the stationary hydrogen gas main $i$ projects. The hydrogen gas escapes from the hollow shaft at its lowest point through one or more holes $j$ for the proper distribution of the reacting gas through the pulp.

The process is preferably carried on substantially at atmospheric pressure and in a continuous manner. For instance, the anhydrous molten salt is added from the aforementioned mixing kettle together with the suspended stanniferous material at a predetermined rate; the pulp entering through a metallic tube $k$, dipping below the level of the pulp in the reaction kettle so as to maintain an hydraulic seal. In the same manner an equivalent volume of the chlorides with the suspended impoverished stanniferous material outflows from the kettle over the baffled weir $l$.

The metallic tin $t$ may be tapped at intervals through a tap hole $q$, by removing a plug $p$ located at the lowest point of the kettle, or it may be continuously removed as formed through a lower siphon $m$, owing to the large difference of specific gravity between the pulp and the molten tin (4 for the pulp against 7.1 for the molten metal). The metal is then cast in the usual slabs.

The hydrogen gas passed in excess to that absorbed by the reaction leaves the kettle through the pipe $n$. The hydrogen is then freed from all moisture. It is slightly compressed and it may be then passed through another similar kettle or kettles or stored for further use.

The overflowing pulp passes into a second or a series of similar reaction kettles, placed in cascade. Finally, from the last kettle of the series, the issuing pulp passes to a suitable leaching apparatus. The gangue is freed by counter-current washing of any chlorine compounds. It can be then discarded as waste. The aqueous solution of the recuperated chlorides is concentrated in any suitable manner, well known in the arts, and finally it is dehydrated in a vacuum pan or caustic pot, or in both; the dry salt is then sent to a melting kettle in which it is fused and rendered anhydrous by boiling. It then passes to the mixing kettle for another cycle of operations.

The hydrogen used in the process may be obtained from any of the well known sources of this gas, as from the electrolysis of water or from purified water-gas, coke oven gas, etc. Or, instead of pure hydrogen, I may elect to use hydrocarbon gases or vapors in the same general type of apparatus. For example, I may use hydrogen containing gases such as water gas, town gas, natural gas and the like. Or, the hydrocarbon can be obtained from petroleum products such as crude oil, kerosene, gasolene, or from tars, benzol, etc. I may also use a certain percentage of an inert gas such as nitrogen, mixed with the hydrogen gas or the hydrocarbon.

The reduction reaction being endothermic the reaction and the other kettles are exteriorly heated by any suitable source of heat. The heating could also be done internally by means of electrical resistance through the pulp by passing an alternating current through suitable electrodes.

Owing to the cracking of the injected hydrocarbon there is a liberation and deposition of elemental carbon in an extreme state of division and in a very active form. This carbon exerts a favorable influence in maintaining the strongly reducing conditions primarily caused by the presence of hydrogen or light hydrocarbons. This additive reducing influence of carbon and carbon compounds, such as carbon monoxide, etc., has a beneficial effect on any water vapor formed by the reduction of the tin oxide with the subsequent production of hydrogen and carbon monoxide.

The pot or kettle method above described is adapted for treating tin oxide quite regardless of the manner or source from which the oxide is secured.

The foregoing description is to be construed in an illustrative rather than a limiting sense inasmuch as various modifications may be made by those skilled in the art without departure from the scope of the invention as defined in the appended claims.

What I claim is:—

1. In the production of tin, the method which includes subjecting tin oxide to the action of a fluid reducing agent while the oxide is held in a non-metallic molten bath.

2. In the production of tin, the method which includes subjecting comminuted tin oxide to the action of hydrogen while such tin oxide is held in suspension in a molten pulp-like chloride mass.

3. In the production of tin, the method which consists in subjecting the dried crushed material containing tin oxide to treatment in a molten bath of anhydrous chlorides and passing a stream of hydrogen gas through the mass.

4. In the production of tin, the method which consists in dehydrating and crushing tin oxide, feeding the same to a molten bath of anhydrous chlorides and passing hydrogen gas through the bath.

5. In the production of tin, the method which consists in subjecting dried crushed tin oxide to treatment in a molten bath of anhydrous ternary cholorides of sodium, potassium and calcium and discharging hydrogen in the bath.

6. In the production of tin, the method which consists in dehydrating and pulverizing tin oxide and subjecting it to the reducing action of hydrogen while immersed in a bath of anhydrous chlorides.

7. In the production of tin, the method which consists in providing a molten bath of anhydrous chlorides of the alkali and alkali-earth groups, adding dried crushed tin bearing material to the bath and passing hydrogen gas through the bath.

8. In the production of tin, the method which consists in providing a molten pulp-like bath of anhydrous chlorides, adding comminuted tin bearing material to the molten bath, passing hydrogen gas through the bath, withdrawing the reduced metallic tin from the lower part of the bath and discharging the spent pulp at a level higher than that of the reduced metal.

In witness whereof, I have hereunto signed my name.

AUGUSTIN LEON JEAN QUENEAU.